United States Patent [19]
McCormick et al.

[11] 3,790,042
[45] Feb. 5, 1974

[54] APPARATUS FOR REGULATING THE AMOUNT OF LIQUID ADMINISTERED PER UNIT TIME

[75] Inventors: James B. McCormick, Hinsdale; Shunjiro Ohba, Chicago, both of Ill.

[73] Assignee: Pelam Inc., Hinsdale, Ill.

[22] Filed: Sept. 15, 1970

[21] Appl. No.: 72,313

[52] U.S. Cl. ............................. 222/52, 128/214 E
[51] Int. Cl. .............................................. B67d 5/08
[58] Field of Search 222/52, 59, 63, 71; 128/214 E, 128/DIG. 13; 73/194 EM, 194 E, 432 PS; 324/71 CP; 340/239 R; 137/486, 487.5, 244

[56] References Cited
UNITED STATES PATENTS

| | | | |
|---|---|---|---|
| 3,252,623 | 5/1966 | Corbin et al. | 128/214 E |
| 3,450,153 | 6/1969 | Hildebrandt et al. | 128/214 E |
| 3,194,068 | 7/1965 | Mannherz et al. | 73/194 EM |
| 3,163,176 | 12/1964 | Darling | 128/214 E |
| 3,390,577 | 7/1968 | Phelps et al. | 340/239 R |

FOREIGN PATENTS OR APPLICATIONS

| | | | |
|---|---|---|---|
| 1,109,175 | 4/1968 | Great Britain | 128/DIG. 13 |

*Primary Examiner*—Stanley H. Tollberg
*Assistant Examiner*—James M. Slattery
*Attorney, Agent, or Firm*—Fitch, Even, Tabin & Luedeka

[57] ABSTRACT

A regulating apparatus for regulating the amount of liquid administered per unit time to a recipient by an administering apparatus. The administering apparatus includes a drip chamber connected by means of a delivery tube to a supply of drops of liquid and by a second delivery tube to a device for transferring the liquid to a recipient. The regulating apparatus comprises a first means which senses the drops of liquid passing through the drip chamber and which produces pulses representing the number of drops. The pulses produced by the sensing means are accumulated in a second means which produces a first signal related to the number of pulses received per unit time. The amplitude of the first signal is changed by a third means at a rate related to a preselected drip rate. A fourth means is provided for generating a reference signal which is compared in a fifth means to the changed amplitude of the first signal, the fifth means producing the third signal related to the difference between the signals. The third signal is fed to a sixth means which supplies the proper current to a bi-directional motor to drive the motor in one direction when the changed first signal is less than the reference signal and to drive the motor in the opposite direction when the changed signal is greater than the reference signal. The bi-directional motor is connected to a valve or clamp which is disposed on the delivery tube so as to vary the amount of liquid flowing through the tube. Thus, if the drip rate becomes greater than the preselected rate, the valve is moved toward a closed position by the motor to reduce the drip rate, while if the drip rate is less than the preselected rate, the valve is moved toward the open position to increase the drip rate.

12 Claims, 3 Drawing Figures

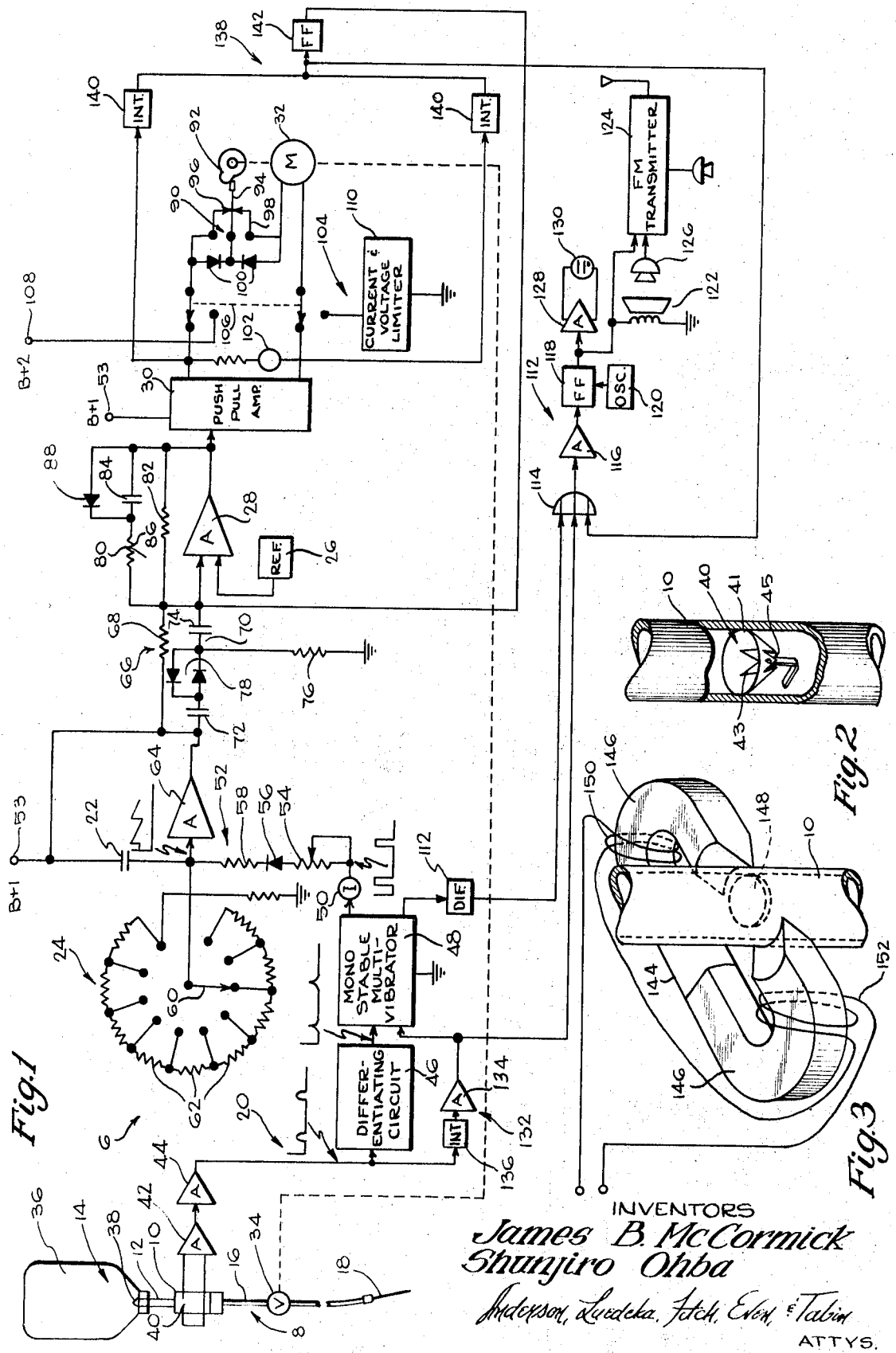

APPARATUS FOR REGULATING THE AMOUNT OF LIQUID ADMINISTERED PER UNIT TIME

The present invention is directed to an apparatus for regulating the amount of parenteral liquid or other liquid administered per unit time to a recipient.

Blood and other parenteral liquids are conventionally supplied or stored in bottles having a cap which defines a drop-forming orifice. In administering the liquid, such a bottle is suspended in an inverted position above the recipient or patient, with one end of a delivery tube in communication with the drop-forming orifice and with the delivery tube connected through a transparent drip chamber to a needle or other device for introducing the liquid into the body of the recipient. Gravity causes the fluid to flow from the bottle and into the body, the drop-forming orifice converting the liquid flow into drops which fall through the upper portion of the drip chamber and collect in its lower portion. A clamp or valve disposed on the delivery tube, either above or below the drip chamber, is adjusted until the desired rate of liquid flow is obtained. The desired flow rate will depend upon a number of factors, including the type of liquid and the condition of the patient.

In most instances, the flow rate is adjusted by visually observing and timing the number of drops passing through the drip chamber and manually adjusting the clamp until the desired number of drops per unit time is obtained. During the administration of the liquid, the drop rate, as adjusted, may vary from the desired amount due, for example, to changes in the condition or position of the patient, to obstruction in the delivery tube or needle, and to change in the head of the liquid disposed above the drop-forming orifice. The above adjustments require the nurse or doctor to be constantly watchful of the administering of the liquid.

Various attempts have been made to apply instrumentation to this procedure to achieve more precise control over the flow (drop) rate, and to eliminate the necessity for constant supervision. Devices have been provided to sense the drop rate and provide a visual or an audible signal for each drop passing through the drip chamber. Also, devices have been provided to automatically sound an alarm if the flow of liquid from the bottle ceases for any reason, including the exhaustion of the supply. Moreover, devices have been provided to regulate the rate of flow of the liquid, but these devices have been quite complicated and have not been readily adaptable to existing liquid administering apparatus.

An object of the present invention, therefore, is to provide an improved apparatus for regulating the amount of parenteral liquid or other liquid administered per unit time to a recipient.

Another object of the invention is to provide a simple, mobile and readily applied apparatus for automatically monitoring and regulating the drip rate and thus the amount of liquid administered per unit time.

Other objects and advantages of the present invention will become apparent by reference to the accompanying drawing wherein:

FIG. 1 is a schematic representation of a liquid regulating apparatus constructed in accordance with the present invention;

FIG. 2 is an enlarged schematic drawing of one portion of FIG. 1; and

FIG. 3 is an enlarged schematic drawing of another embodiment of FIG. 2.

Briefly, a regulating apparatus 6 in accordance with the present invention is employed to regulate the amount of liquid administered per unit time to a patient by an administering apparatus 8. The administering apparatus includes a drip chamber 10 connected by means of a delivery tube 12 to a supply 14 of drops of liquid and by a second delivery tube 16 to a device 18 for transferring the liquid to a patient. The regulating apparatus comprises a first means 20 which senses the drops of liquid passing through the drip chamber 10 and which produces pulses representing the number of drops. The pulses produced by the sensing means 20 are accumulated in a second means 22 which produces a first signal related to the number of pulses received per unit time. The amplitude of the first signal is changed by a third means 24 at a rate related to a preselected drip rate. A fourth means 26 is provided for generating a reference signal which is compared in a fifth means 28 to the changed amplitude of the first signal, the fifth means producing a third signal related to the difference between the signals. The third signal is fed to a sixth means 30 which supplies the proper current to a bi-directional motor 32 to drive the motor in one direction when the changed first signal is less than the reference signal and to drive the motor in the opposite direction when the changed signal is greater than the reference signal. The bi-directional motor 32 is connected to a valve or clamp 34 which is disposed on the delivery tube 16 so as to vary the amount of liquid flowing through the tube. Thus, if the drip rate becomes greater than the preselected rate, the valve 34 is moved toward a closed position by the motor to reduce the drip rate, while if the drip rate is less than the preselected rate, the valve 34 is moved toward the open position to increase the drip rate.

More particularly, in the illustrated embodiment, the regulating apparatus 6 is applied to a conventional intravenous infusion apparatus 8. However, the regulating apparatus 6 may be applied to any administering apparatus, such as a blood transusfion apparatus, a drug dispensing apparatus, apparatus for tube feeding infants, apparatus for bladder cavity irrigation, apparatus for feeding a biologic reaction, apparatus for controlling the flow to a reaction mix, etc. The intravenous infusion apparatus 8 comprises the supply 14 of drops of liquid, which supply includes a bottle 36 containing the liquid to be dispensed and a drop forming orifice 38 disposed in the mouth of the bottle. The bottle 36 is hung in its inverted position so as to dispense the liquid therein through the orifice 39 which is connected by means of the first flexible delivery tube 12 to the upper end of the transparent drip chamber 10. The lower end of the drip chamber 10 is connected by the second flexible delivery tube 16 to the transferring device 10 in the form of a hypodermic needle by which the liquid is introduced into the vascular system of the patient. As is well known, the system from the needle 18 back to the supply bottle 36 is a closed one and any restriction in the delivery tubes 12 and 16 or back pressure at the needle 18 caused by temporary stoppage reflects back to the supply and reduces the fluid flow. The pinch clamp or valve 34 is placed on the second delivery tube 16 between the drip chamber 10 and the needle 18 to control the flow of liquid, but since the system is closed the clamp 34 may also be placed on the first delivery tube between the drip chamber 10 and the supply bottle 36.

As is well known, the flow of liquid through the delivery tube 10 can be readily determined by visually observing the drops of liquid in the drip chamber 10. The number of drops per unit time is proportional to the amount of fluid administered per that unit of time.

In the illustrated embodiment, each drop of liquid which passes through the drop chamber 10 is sensed by the sensing means 20 which includes a drip detector 40 disposed within the upper part of the drip chamber. As shown in FIG. 2, the drip detector 40 includes a funnel shaped contact 41 with a star-shaped cut out 43 and a point contact 45 disposed in the center of the cut out. Each drop of liquid flows down the funnel contact 41 and bridges the two contacts as it falls through the drip chamber to thereby complete an electrical circuit between the two contacts. In certain applications, the drip detector may be formed by a pair of spaced, opposed contacts. Other types of drip detectors may be employed such as photoelectric sensing means wherein each drop interrupts a light beam, or a sonic type. FIG. 3 shows another type of drip detector which may be used. This type works on a magnetic principle and is described more fully hereinafter.

The drip detector 40 is connected to the input of a first amplifier 42, the output of which is connected to a second amplifier 44. Each amplifier 42, 44 may include a transistor connected in a common emitter configuration and biased so as to operate between cutoff and full conduction in response to the completion of a circuit between the contacts 40. Preferably, the transistor forming the input amplifier 42 is arranged so that one of the pair of contacts 40 in the drip chamber 10 is grounded so as to minimize voltage hazards.

The output of the second amplifier 44 is applied to a differentiating circuit 46 which converts the variable signal produced by the drops contacting the drip detector 40 to unregulated pulses. The unregulated pulses from the differentiating circuit 46 are converted into constant energy square wave pulses (viz., constant width and constant amplitude pulses) by a monostable multivibrator 48 which may be of the conventional type. The monostable multivibrator 48 also removes any pulses which may be caused by splashing in the drip chamber 10.

The pulses from the monostable multivibrator 48 are applied through an inverter 50 to a drip rate sensing circuit 52. The illustrated drip rate sensing circuit 52 includes a capacitor, which serves as the accumulating means 22, connected to a regulated power supply 53. The capacitor 22 is charged by the pulses generated by the monostable multivibrator through a calibrating potentiometer 54, a steering diode 56, and a fixed resistor 58. Thus, the capacitor 22 is charged by each regulated pulse and the amplitude of the signal appearing across the capacitor is dependent upon the rate of the pulses.

The capacitor 22 is discharged at a preselected rate determined by the drip rate selecting means 24 which provides a plurality of settings for the discharge rate. The drip rate selecting means 24 includes a rotary switch 60 having a separate resistor 62 connected between each pair of its sequential contacts. The values of the resistors 62 are selected so as to increase the rate of discharge if high drip rates are desired and vice versa.

The amplitude of the signal across the capacitor 22 is sensed by a high impedance sensing amplifier 64 which may be a Darlington amplifier. The output of the sensing amplifier 64 is connected through a phase advance or an error velocity circuit 66 to the comparing means 28 which compares the output of the sensing amplifier with a reference signal supplied by the reference means 26. The reference signal may be a fixed amplitude signal or it may be a variable signal supplied by a metering device which measures temperature, pH, change in chemical composition, change in optical property (color or physical), etc.

The phase advance circuit 66 aids in stabilizing the control loop comprised of the drip detector 40, the regulating apparatus 6, the motor 32, and the valve 34. In the illustrated embodiment, the phase advance circuit 66 includes a series resistor 68 connected in parallel with a T-network 70 including a pair of capacitors 72 and 74 and a resistor 76 connected between the junction of the capacitors and ground. The ripple on the signal at the output of the sensing amplifier 64 is removed by a pair of oppositely poled, parallel diodes 78 connected in series with the capacitors. Thus, the signal fed to the comparing means 28 consists of a signal representing the drip rate and a signal representing the rate of change of the drip rate.

The comparing means 28 may be in the form of an operational amplifier with a variable gain. In this connection, a feedback circuit 80 is provided which is arranged so that the operational amplifier has a high gain (e.g., 3.3) for slow minor changes (viz., drift) from a steady state condition, a high gain (e.g., 10) for fast changes from a steady state condition and a low gain (e.g., 1) for intermediate changes. The feedback circuit 80, in the illustrated embodiment, includes a high resistance 82 connected between the output and input of the operational amplifier 28, a serially connected capacitor 84 and a resistance 86 connected in parallel with the high resistance 82, and a diode 88 connected in parallel with the capacitor 84 for limiting reset windup.

The output of the comparing means 28 is connected to a motor drive means 30 which includes a push-pull amplifier designed to operate from a null condition and provide a bi-polar control voltage to drive the bi-directional motor 32 from the single polarity regulated power supply 53. The motor drive means 30 may include complementary emitter followers connected in push-pull with a phase inverter. A current limiter (not shown) may be provided in the push-pull amplifier 30 to protect the push-pull amplifier and the motor from overloads. The motor 32 is mechanically coupled to the valve or clamp 34 so as to operate the same in accordance with rotation of the motor. The clamp 34 may be of the conventional, manually operated type wherein a knurled gear is rotated to provide gradual closing of the tube. In the illustrated embodiment, a gear (not shown) is attached to the motor shaft and is adapted to drive the knurled gear of the clamp.

The motor 32 is provided with a rotation limiting circuit 90 which interrupts the current to the motor 32 if the motor 32 drives the valve 34 to a predetermined closed or open position. The rotation limiting circuit 90, in the illustrated embodiment, includes a lever arm 92 connected to the motor shaft which arm is mounted so as to operate arm 94. The pivoted arm in its normal position makes contact with two end contacts 96 and 98 one of which is connected to one output of the push-pull amplifier 30 and the other of which is connected to one terminal of the motor 32. A pair of back-to-back diodes 100 is connected between the one output of the amplifier 30 and the one terminal of the motor 32, and the junction between the diodes is connected to the pivoted arm 94. Thus normally, both contacts are closed, but one of the contacts is opened when the motor 32 reaches the predetermined limit of its rotation.

A meter 102 is connected between the outputs of the push-pull amplifier 30 to indicate movement of the motor 32. To make sure that the valve 34 is closed when power is removed from the regulating apparatus 6, a homing circuit 104 is provided. In this connection, a pair of ganged single pole double throw switches 106 are provided at the outputs of the push-pull amplifier 30. These two switches 106, when they are thrown to an off position, connect the motor 32 to a power supply 108 and through a current and voltage limiter circuit 110 to ground.

A monitoring means 112 is also provided in the apparatus to visually indicate each drop of liquid passing through the drip chamber 10 and also to provide an audible sound, such as a beep, either locally or remotely for each drop. In the illustrated embodiment, the monitoring circuit 112 receives its input from the output of the monostable multivibrator 48. The output of the monostable multivibrator 48 is applied through a differentiating circuit 112 and an OR circuit 14 to the input of a keying amplifier 116. The output of the keying amplifier 116 is connected to a flip-flop 118 which is turned on for each drop passing through the drip chamber. The flip-flop 118 connects the output of oscillator 120 to a speaker 112 each time a drop is sensed by the drip detector 40. If it is desired to have the beeps transmitted to a remote location, a conventional FM transmitter 124 may be connected to the output of the flip-flop 118. An FM receiver may be maintained as the nurses' station or carried by the nurse to locations away from the station. Alternatively, the signal from the FM transmitter may be designed to cause a light to blink on a control panel at the nurses' station, or may cause an audible or visual alarm to be triggered at the nursing station or at a portable receiver in the event of a malfunction. In the latter case, the receiver would not necessarily respond to each drop with a beep or light blink and would thus be suitable for the monitoring of more than one unit. If desired, a microphone 126 may be provided with the FM transmitter, so as to allow voice communications between locations.

The output of the flip-flop 118 is also connected through an amplifier 128 to a lamp 130. Thus, for each drop sensed by the drip detector 40, the lamp is lit and a beep is produced.

A first safety circuit 132 is provided to sound an alarm and close the valve completely if the drip chamber 10 floods. In the illustrated embodiment, the first safety circuit 132 includes an amplifier 134, having an integrating circuit 136 at its input, connected to the output of the second pre-amplifier 44. Thus, the amplifier 134 is only turned on if a continuous signal is obtained from the drip detector 40. The output of the amplifier 134 is connected to the monostable multivibrator to switch the monostable multivibrator 48 to its mode which causes the valve 34 to close. The output of the amplifier 134 is also connected through the "OR" circuit 114 to the monitoring circuit 112 to thereby produce a continuous sound and a steady light.

A second safety circuit 138 is provided to cause the motor 32 to close the valve 34 in the event that the motor 32 continues to run in either direction for too long a period. In the illutrated embodiment, this second safety circuit 138 includes an integrating circuit 140 connected to each output of the push-pull amplifier 30. The outputs of the two integrating circuits 140 are connected to the input of a flip-flop 142. Normally, the outputs of the integrating circuits 140 are insufficient to switch the flip-flop 142. When current is applied to the motor 32 for a predetermined length of time, the output of one of the integrating circuits becomes sufficient to actuate the flip-flop. The output of the flip-flop 142 is connected to the input of the comparing means 28 so that if the flip-flop changes states, the input to the comparing means 28 is clamped to a voltage such that the motor 32 is driven to its closed position.

The outputs of the integrating circuits 140 are also connected to the OR circuit of the monitoring circuit 112 so as to cause the monitoring circuit to provide a continuous sound in the event the flip-flop 142 is actuated.

As previously indicated, FIG. 2 shows an embodiment of a drip detector which may be used in the above-described regulating apparatus. This drip detector includes a permanent magnet 144 having a pole shoe 146 attached to each end thereof. The ends of the pole shoes 146 are tapered to an arcuate edge - the edges of the shoes being spaced sufficiently to accommodate the drip chamber 10. A ferromagnetic disk 148 is disposed in the drip chamber 10 and is maintained in position by the magnetic field between the pole shoes. The disk 148 will tend to assume a position adjacent one pole shoe 146.

Drops passing through the chamber cause a slight pivoting of the disk 148, which is sensed by a sensing coil 150 wrapped around the pole shoe 146. A hum bucking coil 152 is wrapped around the other pole shoe 146 and is connected in series with the sensing coil 150. The series connected coils 150 and 152 are connected to the input pre-amplifier 42.

Various changes and modifications may be made in the above-identified regulating apparatus without deviating from the spirit or scope of the present invention. Various features are set forth in the accompanying claims.

We claim:

1. Apparatus for regulating the amount of liquid administered per unit time to a recipient by an administering apparatus including a drip chamber through which drops of liquid flow in relation to the rate of liquid being administered and a valve controlling the rate of liquid being administered, said regulating apparatus comprising first means for sensing the drops of liquid passing through the drip chamber and producing pulses representing the number of drops, second means for accumulating said pulses and producing a first signal related to the number of pulses received per unit of time, third means for changing the amplitude of said first signal at a rate related to a preselected drip rate, a bi-directional motor connected to said valve, fourth means for generating a reference signal, fifth means for comparing the changed amplitude of said first signal with said reference signal and producing a third signal related to the difference between the signals, and sixth means responsive to said third signal for driving said motor in one direction when said changed signal is greater than the reference signal and in the other direction when said changed first signal is less than said reference signal.

2. A regulating apparatus in accordance with claim 1 in which the second means is a capacitor which is charged by each pulse, and said third means is a resistor connected so as to discharge said capacitor.

3. A regulating apparatus in accordance with claim 1 in which a monitoring circuit is provided which includes an indicating means and a sixth means connected between said indicating means and said first means for actuating said indicating means in response to each pulse.

4. A regulating apparatus in accordance with claim 1 in which said first means includes a drip detector in the drip chamber for sensing each drop and providing an unregulated pulse for each drop and a monostable multivibrator coupled to said drip detector for providing a regulated pulse for each unregulated pulse received therein, the output of said multivibrator being coupled to said second means.

5. A regulating apparatus in accordance with claim 4 in which the second means is a capacitor which is charged by each pulse, and said third means is a resistor connected so as to discharge said capacitor.

6. Apparatus for regulating the amount of liquid administered per unit time to a recipient by an administering apparatus including a drip chamber through which drops of liquid flow in relation to the rate of liquid being administered and a valve controlling the rate of liquid being administered, said regulating apparatus comprising first means for sensing the drops of liquid passing through the drip chamber and producing pulses representing the number of drops, said first means including a drip detector in the drip chamber for sensing each drop and providing an unregulated pulse for each drop and a monostable multivibrator coupled to said drip detector for providing a regulated pulse for each unregulated pulse received therein, second means coupled to the output of said multivibrator for accumulating said pulses and producing a first signal related to the number of pulses received per unit time, third means for changing the amplitude of said first signal at a rate related to a preselected drip rate, a bi-directional motor connected to said valve, fourth means for generating a reference signal, fifth means for comparing the changed amplitude of said first signal and said reference signal and producing a third signal related to the difference between the signals, sixth means responsive to said third signal for driving said motor in one direction when said changed signal is greater than the reference signal and in the other direction when said changed first signal is less than said reference signal and a first safety circuit including an amplifier having an integrating circuit in its input, the input of said integrating circuit being connected to said first drip detector and the output of said amplifier being connected to said multivibrator to switch said multivibrator to a mode such as to close said valve.

7. A regulating apparatus in accordance with claim 6 in which a phase advance circuit is connected at the input of said fifth means so as to advance the phase of the changed signal.

8. Apparatus for regulating the amount of liquid administered per unit time to a recipient by an administering apparatus including a drip chamber through which drops of liquid flow in relation to the rate of liquid being administered and a valve controlling the rate of liquid being administered, said regulating apparatus comprising first means for ensing the drops of liquid passing through the drip chamber and producing pulses representing the number of drops, second means for accumulating said pulses and producing a first signal related to the number of pulses received per unit time, third means for changing the amplitude of said first signal at a rate related to a preselected drip rate, a bi-directional motor connected to said valve, fourth means for generating a reference signal, fifth means for comparing the changed amplitude of said first signal with said reference signal and producing a third signal related to the difference between the signals, a phase advance circuit at the input of said fifth means for advancing the phase off the changed signal, and sixth means responsive to said third signal for driving said motor in one direction when said changed signal is greater than the reference signal and in the other direction when said changed first signal is less than said reference signal.

9. A regulating apparatus in accordance with claim 8 wherein said fifth means is an operational amplifier having a high gain for slow minor changes from a steady state condition, a high gain for fast changes from a steady state condition and a low gain for intermediate changes.

10. Apparatus for regulating the amount of liquid administered per unit time to a recipient by an administering apparatus including a drip chamber through which drops of liquid flow in relation to the rate of liquid being administered and a valve controlling the rate of liquid being administered, said regulating apparatus comprising first means for sensing the drops of liquid passing through the drip chamber and producing pulses representing the number of drops, second means for accumulating said pulses and producing a first signal related to the number of pulses received per unit time, third means for changing the amplitude of said first signal at a rate related to a preselected drip rate, a bi-directional motor connected to said valve, fourth means for generating a reference signal, fifth means for comparing the changed amplitude of said first signal with said reference signal and producing a third signal related to the difference between the signals, and sixth means responsive to said third signal for driving said motor in one direction when said changed signal is greater than the reference signal and in the other direction when said changed first signal is less than said reference signal, said first means including seventh means for establishing a horizontal magnetic field across said drip chamber, thee extent of the field in the vertical direction being small, a disc of faromagnetic material disposed in said drip chamber, said disc being smaller than the internal diameter of the drip chamber, an eighth means for sensing changes in the magnetic field produced by movement of said disc caused by drops striking said disc.

11. Apparatus for regulating the amount of liquid administered per unit time to a recipient by an administering apparatus including a drip chamber through which drops of liquid flow in relation to the rate of liquid being administered and a valve controlling the rate of liquid being administered, said regulating apparatus comprising first means for sensing the drops of liquid passing through the drip chamber and producing pulses representing the number of drops, said first means including a drip detector in the drip chamber for sensing each drop and providing an unregulated pulse for each drop and a monostable multivibrator coupled to said drip detector for providing a regulated pulse for each unregulated pulse received therein, a second means connected to the output of said multivibrator for accumulating said pulses and producing a first signal related to the number of pulses received per unit time, said second means including a capacitor which is charged by each pulse, third means for changing the amplitude of said first signal at a rate related to a preselected drip rate, said third means being a resistor connected so as to discharge said capacitor, a bi-directional motor connected to said valve, said third means including a resistor connected so as to discharge said capacitor, fourth means for generating a reference signal, fifth means for comparing the changed amplitude of said first signal with said reference signal and producing a third signal related to the difference between the signals, a phase advance circuit connected at the input of said fifth means for advancing the phase of the changed signal, and sixth means responsive to said third signal for driving said motor in one dirction when said changed signal is greater than the reference signal and in the other direction when said changed first signal is less than said reference signal.

12. A regulating apparatus in accordance with claim 11 wherein said fifth means is an operational amplifier having a high gain for slow, minor changes from a steady state condition, a high gain for fast changes from a steady state condition and a low gain for intermediate changes.

* * * * *